Jan. 5, 1954
W. E. HANFORD
2,665,290
SEPARATION OF OXYGENATED ORGANIC COMPOUNDS
Filed Nov. 30, 1948
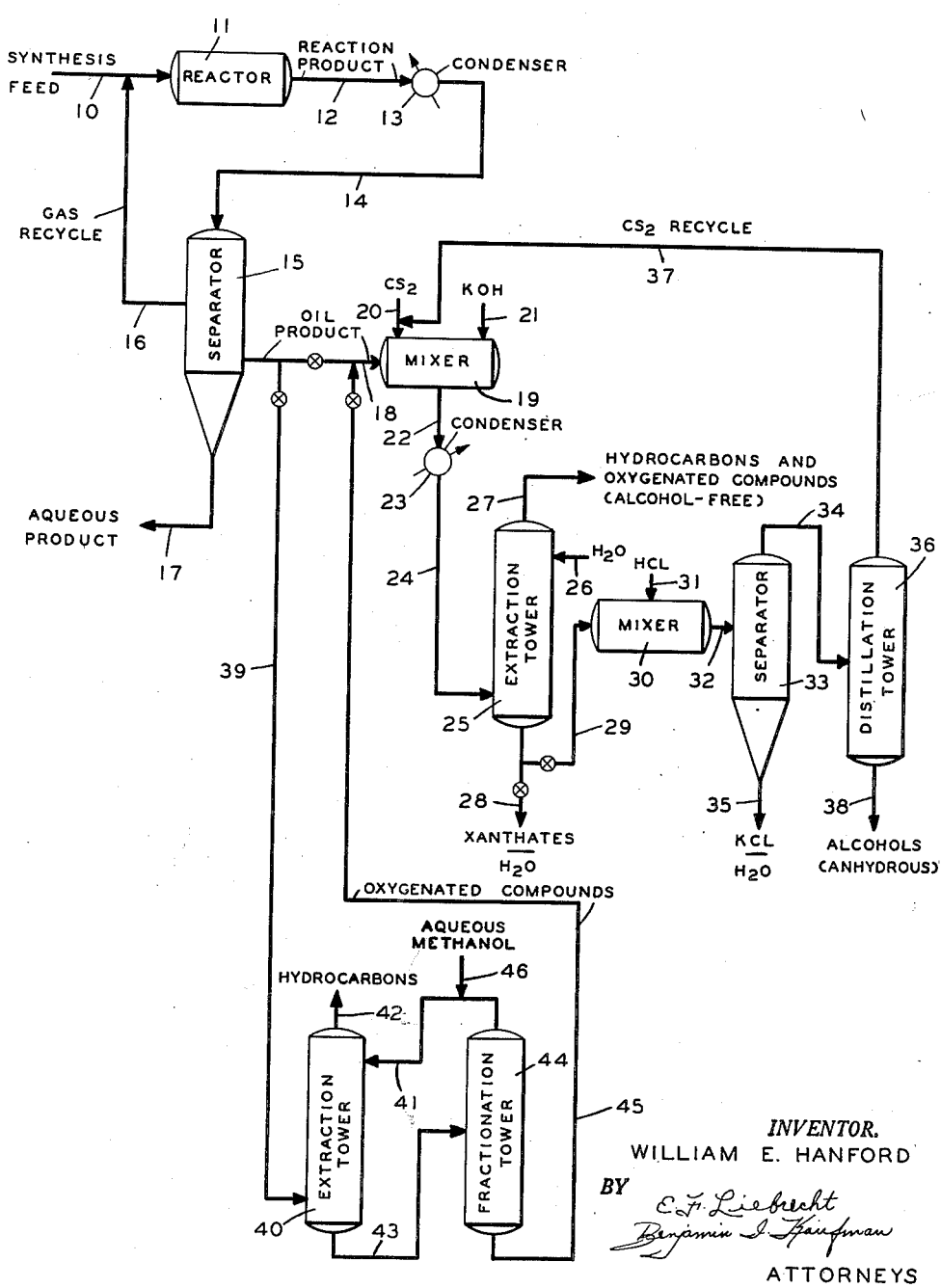
INVENTOR.
WILLIAM E. HANFORD
BY
ATTORNEYS Patented Jan. 5, 1954

2,665,290

UNITED STATES PATENT OFFICE 2,665,290

SEPARATION OF OXYGENATED ORGANIC COMPOUNDS

William E. Hanford, Short Hills, N. J., assignor to The M. W. Kellogg Company, Jersey City, N. J., a corporation of Delaware Application November 30, 1948, Serial No. 62,621

20 Claims. (Cl. 260—450)

This invention relates to the separation of oxygenated organic compounds. In one aspect, the invention relates to the separation of alcohols from the reaction effluent produced in the hydrogenation of oxides of carbon. More particularly, in this aspect the invention relates to the separation of alcohols present in an oil condensate product obtained from the condensation of the reaction effluent produced in the hydrogenation of oxides of carbon.

It is known, that hydrogen and oxides of carbon, particularly carbon monoxide, may be made to react exothermically in the presence of certain catalysts and under specific reaction conditions to form hydrocarbons and alcohols having more than one carbon atom per molecule, and other oxygenated organic compounds which may comprise aldehydes, ketones, acids and esters. In general, the synthesis of hydrocarbons and oxygenated organic compounds by the hydrogenation of carbon monoxide, is accomplished in the presence of a metal or an oxide of a metal, such as one chosen from group VIII of the periodic table, as a catalyst at pressures below about 500 pounds per square inch gage and at temperatures below about 750° F.

Various methods have been practiced to effect the reaction of hydrogen and carbon monoxide to produce organic compounds. Among these methods are those known as fixed-bed catalyst operations and fluid-bed catalyst operations. The fixed-bed operation comprises passing a reaction mixture of hydrogen and carbon monoxide through a stationary bed of catalyst in a reaction zone; and the fluid-bed operation comprises passing such a reaction mixture through a finely divided catalyst mass, suspended in the reaction mixture in the reaction zone, under conditions such that a so-called pseudo-liquid dense phase of solids is formed. Characteristically, certain reaction conditions are necessary for each of these processes and for the particular catalyst used. The synthesis feed gas or reaction mixture comprises a mixture of about 1:5 mols of hydrogen per mol of carbon monoxide and may be prepared by various means including the catalytic conversion of natural gas, steam and carbon dioxide. It will be understood, however, that while the hydrogenation of carbon monoxide has been referred to specifically, such above-referred hydrogenation is of wider application and includes within its scope the hydrogenation of any suitable carbon oxide.

The reaction effluent thus produced in the aforementioned hydrogenation of an oxide of carbon, comprising hydrocarbons, alcohols and other oxygenated organic compounds which may include aldehydes, ketones, acids and esters, is obtained in the vapor state in the form of reactor outlet gases. These gases are generally passed through one or more condensation zones in which they are cooled to temperatures within the range between about 40° F. and about 150° F. The resulting condensate then separates into an oil condensate product, a water condensate product and an uncondensed gas product, each product containing the aforementioned oxygenated compounds.

It is, therefore, an object of this invention to provide an improved process for the separation of alcohols present in the oil condensate product obtained from the condensation of the reaction effluent produced in the hydrogenation of oxides of carbon.

Another object of the invention is to provide an improved process for the separation of alcohols from other oxygenated organic compounds and hydrocarbons present in the oil condensate product obtained from the condensation of the reaction effluent produced in the hydrogenation of oxides of carbon, economically and efficiently.

Other objects and advantages inherent in the invention will be apparent from the following more detailed disclosure.

In accordance with the general process of the invention, as more fully hereinafter described, it has been found that the aforementioned oil condensate product may be treated with carbon disulfide and an alkali to convert alcohols present to their corresponding xanthates. These xanthates are next separated from hydrocarbons and other oxygenated organic compounds present in the resulting mixture, by treating this mixture with a solvent having a preferential solvent power for the xanthates. The extract thus produced is next contacted with a mineral acid to regenerate the alcohols from the xanthates contained therein, and the alcohols thus produced are subsequently separated from the formed alkali salts and reformed carbon disulfide.

In another modification of the general process of the invention, as more fully hereinafter described, the aforementioned oil condensate product is first contacted with a solvent for the alcohols and other oxygenated organic compounds contained therein, in order to effect their separation from hydrocarbons present. The extract thus produced, comprising alcohols and other oxygenated organic compounds, is next treated with carbon disulfide and an alkali to convert the alcohols to their corresponding xanthates. The xanthates thus produced are separated from other oxygenated organic compounds, and subsequently converted to their corresponding alcohols in accordance with the general procedure indicated above.

The accompanying drawing illustrates diagrammatically one form of the apparatus employed and capable of carrying out one embodiment of the process of the invention. While the invention will be described in detail, by reference to the embodiment illustrated in the drawing, it should be noted that it is not intended that it be limited thereto, but is capable of other embodiments which may extend beyond the scope of the apparatus illustrated. Furthermore, the distribution and circulation of liquids and vapors is illustrated in the drawing by a diagrammatic representation of the apparatus employed. Valves, pumps, compressors and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, a synthesis feed comprising a reaction mixture of hydrogen and an oxide of carbon, such as carbon monoxide, at varying mol ratios, such as 2:1, is supplied through line 10 and transferred through this line to a synthesis reaction vessel, represented in the drawing by reactor 11. In reactor 11 the reaction mixture is contacted with a hydrogenation catalyst, such as a reduced iron or cobalt catalyst, at temperatures varying between about 300° F. and about 700° F. and at pressures varying between about atmospheric pressure and about 500 pounds per square inch, and is carried out according to the aforementioned conventional fixed-bed or fluid-bed operations. The resulting reaction product obtained from reactor 11 is withdrawn through line 12. This product is in the vapor form substantially as it comes from the reactor within the aforementioned temperature range, containing water, methane and higher hydrocarbons, and oxygenated organic compounds comprising methanol and higher alcohols, and may also comprise $C_2$ and higher acids, and also aldehydes, ketones and esters depending upon the condition of the reaction. This product is first cooled to condense substantially large quantities of normally liquid components. Conveniently, condensation may be obtained in a plurality of cooling stages which are represented diagrammatically in the drawing by condenser 13 with which line 12 connects. From condenser 13 the resulting mixture of condensate and uncondensed gases passes through line 14 to a separator 15. In the latter, the uncondensed gases are withdrawn through line 16 and recycled, via this line, into reactor 11 through line 10 with which line 16 connects. The condensate in separator 15 separates as a lower water condensate product and an upper oil condensate product. Both products thus obtained contain alcohols and other oxygenated organic compounds; those of lower molecular weight tending to remain in the water condensate product, while those of higher molecular weight tend to remain in the oil condensate product. The water condensate product is drawn off from the bottom of separator 15 through line 17 for further use or treatment outside the scope of the present process. The oil condensate product is drawn off at an intermediate point from separator 15 through valved-line 18. It should be noted that apparatus embodying more than one separation stage may be employed, if desired; for example, primary and secondary separation stages may be introduced, operating successively and respectively at temperatures of about 150° F. and about 100° F.

The oil condensate product withdrawn from separator 15, comprising a mixture of hydrocarbons, alcohols and other oxygenated organic compounds, is next transferred through valved-line 18 to a mixer 19. In mixer 19 the aforementioned mixture is contacted with carbon disulfide and an alkali, such as potassium hydroxide or sodium hydroxide, which are introduced into mixer 19 through lines 20 and 21, respectively, in amounts sufficient to convert alcohols present in the mixture to their corresponding xanthates. If so desired, the reactants in mixer 19 may be heated to hasten the reaction. It should be noted that the alkali thus introduced into mixer 19 may be either in an aqueous solution or in the solid state, and may be introduced into mixer 19 either separately through line 21, as shown in the drawing, or combined externally with carbon disulfide and the combined mixture introduced through line 20, if so desired. After the desired reaction has taken place in mixer 19, the resulting product of the reaction, comprising a mixture of hydrocarbons, xanthates and other oxygenated organic compounds, is withdrawn through line 22. This mixture is next transferred through line 22 to a condenser 23 in order to bring the reaction mixture to room temperature.

The cooled mixture in condenser 23 is next transferred through line 24 to a low point in an extraction tower 25. In tower 25, the mixture is subjected to an intimate countercurrent contact with a solvent having a preferential solvent power for the xanthates present and is introduced at an upper point through line 26. This solvent comprises an aqueous solution of a water-miscible compound (ranging from highly dilute to concentrated solutions) such as an alcohol, ketone or cyclic ether (for example; methanol, ethanol, acetone, methyl ethyl ketone or dioxane) or may be water alone. The mixture introduced through line 24 and the solvent are contacted in tower 25 under conditions effective to absorb in the solvent substantially all of the xanthates contained in the mixture and thus effect separation of the xanthates from other oxygenated organic compounds and hydrocarbons present. As a result of the foregoing treatment an upper oil layer, comprising hydrocarbons and alcohol-free oxygenated organic compounds, and a lower aqueous layer comprising xanthates of the alcohols present in the feed in line 24 are formed in tower 25. The upper oil layer is withdrawn through line 27 for further use or treatment outside the scope of the present process, while the lower aqueous layer comprising xanthates of the respective alcohols is withdrawn through valved-line 28 as an intermediate product of the process of the invention, or subjected to further treatment, as hereinafter described, in order to regenerate alcohols from the thus-formed xanthates.

In order to effect regeneration of alcohols from the aforementioned aqueous mixture of xanthates in line 28, this mixture is next transferred from line 28 through valved-line 29, with which line 28 connects, to a mixer 30 where it is contacted with a mineral acid, such as hydrochloric acid (shown in the drawing) or sulfuric acid, which is introduced into mixer 30 through line 31. As a result of the treatment in mixer 30 there is obtained as the product of the reaction, a mixture of alcohols, the alkali salt of the introduced mineral acid (potassium chloride in the drawing) and reformed carbon disulfide. This mixture is next transferred from mixer 30 through line 32 to a separator 33. In separator 33 the mixture introduced through line 32 is separated into an upper phase comprising relatively low-boiling alcohols present which are withdrawn through line 34 together with the aforementioned reformed carbon disulfide; and there is also formed a lower aqueous phase comprising the alkali salt of the aforementioned mineral acid, which is withdrawn as bottoms through line 35 for further use or treatment outside the scope of the present process. The mixture of alcohols and reformed carbon disulfide in line 34 is next transferred to a distillation tower 36. In tower 36 the mixture introduced through line 34 is heated under proper operating conditions of temperature and pressure effective to distill overhead carbon disulfide present which is withdrawn through line 37 and recycled through this line for further use in mixer 19, via line 29 with which line 37 connects. Bottoms from tower 36, comprising a substantially water-free mixture of alcohols, are withdrawn through line 38 as products of the process.

As hereinbefore indicated, the oil condensate product in line 18 may be subjected to a primary extraction treatment in order to effect the separation of alcohols and other oxygenated organic compounds from hydrocarbons present, prior to the aforementioned xanthate formation and subsequent alcohol regeneration. For this purpose, the oil condensate product is transferred from line 18 through valved-line 39 to a low point in an extraction tower 40. In tower 40 the oil condensate product introduced through line 39 is subjected to intimate countercurrent contact with a solvent for the alcohols and other oxygenated organic compounds contained therein. Such solvent may comprise a relatively low-boiling alcohol as methanol (as shown in the drawing), ethanol or propanol, which is introduced into tower 40 at an upper point through line 41. The solvent treating agent and the oil condensate product are contacted in tower 40 under conditions effective to absorb in the treating agent substantially all of the alcohols and other oxygenated compounds present and thus effect separation of these compounds from hydrocarbons present. As a result of the foregoing treatment, a lower alcohol layer and an upper hydrocarbon or oil layer are formed in tower 40. Inasmuch as anhydrous light alcohols exhibit high solubilities for hydrocarbons as well as for alcohols and other oxygenated organic compounds, dilution of such alcohols will effect an improvement in the selectivity of extraction, so that absorption of hydrocarbons in the alcohol treating agent is substantially prevented. To obtain such dilution, the alcohol solvent treating agent introduced into tower 40, through line 41, may be employed as a dilute solution, or if so desired, the alcohol solvent may be introduced in an anhydrous state, while water used for dilution may be introduced at an upper point above the alcohol inlet in tower 40. The use of additional water in the manner described is effective not only for the purpose of alcohol dilution, but its introduction at an upper point in tower 40 accomplishes the result of washing the upper hydrocarbon or oil layer free of the added alcohol treating agent.

Following the above-mentioned treatment in tower 40, there is present an upper hydrocarbon or oil layer containing substantially all the hydrocarbons that were present in the oil condensate product entering tower 40 through line 39, and a lower aqueous methanol layer containing alcohols and other extracted oxygenated organic compounds. The upper hydrocarbon or oil layer is withdrawn overhead as a raffinate from tower 40 through line 42, for further use or treatment outside the scope of the present process, while the lower aqueous methanol layer is withdrawn as an extract through line 43. This extract is next transferred through line 43 to a fractionation tower 44. Tower 44 functioning as a methanol stripper is operated under conditions effective to separate the aqueous methanol layer introduced from tower 40 through line 43, into an overhead alcohol fraction, comprising methanol, which is withdrawn through line 41, and a bottom fraction comprising alcohols, other oxygenated organic compounds and water. This bottom fraction is withdrawn from tower 44 through line 45. The overhead alcohol fraction from tower 44 is cooled to liquefy the methanol component. Methanol thus liquefied is transferred through line 41 for repeated use as the solvent treating agent in tower 40 in the process hereinbefore described. Make-up methanol is introduced through line 46 via line 41 with which line 46 connects. Bottoms from tower 44 comprising an aqueous mixture of alcohols and other oxygenated organic compounds, as described above, are next transferred through line 45 into mixer 19, via line 18, for subsequent xanthate formation and alcohol regeneration in the process as hereinbefore described.

The following examples will serve to illustrate, but are not intended in any way to unduly limit the process of the present invention.

*Example I*

1000 grams of an oil condensate product produced from the catalytic hydrogenation of carbon monoxide was obtained. This product had a composition, by weight, of: 80% hydrocarbons, 15% alcohols (average molecular weight of 102) and 5% of other oxygenated organic compounds. Employing apparatus similar to that illustrated in the drawing of the present embodiment of the process of the invention, this mixture was heated under stirring with 80 grams of carbon disulfide and 88 grams of a 50% aqueous solution of sodium hydroxide, for 15 minutes. After cooling to room temperature, the resulting reaction product was subjected to countercurrent extraction with a mixture comprising 100 grams methanol and 200 grams water. To the resulting alcoholic extract were added 110 grams of concentrated hydrochloric acid. After cooling and stratification, the resulting upper layer was decanted and methanol was stripped by distillation. The residue, upon examination, was found to consist of 145 grams of an alcohol mixture, having an average molecular weight of approximately 102, and equal to that of the alcohols present in the starting mixture.

*Example II*

1000 grams of a mixture of oxygenated organic compounds, obtained by extraction with aqueous methanol (and subsequent stripping of the methanol solvent) of the aforementioned oil condensate product in Example I, were analyzed and found to contain, by weight: 75% alcohols (average molecular weight of 102) and 15% of other oxygenated organic compounds. Employing apparatus similar to that illustrated in the drawing of the present embodiment of the process of the invention, this mixture was heated under stirring with 605 grams of carbon disulfide and 445 grams of pulverized potassium hydroxide for 10 minutes. The resulting product was subjected to countercurrent extraction with 1000 grams of a mixture of acetone and water (20:80 by volume). To the resulting extract were added 750 grams of concentrated hydrochloric acid. After cooling and stratification, the resulting upper layer was decanted and stripped of solvent. The residue, upon examination, was found to consist of 720 grams of an alcohol mixture having an average molecular weight of approximately 104.

While a particular embodiment of the process of the present invention has been described, for purposes of illustration, it should be understood that various modifications and adaptations thereof, which will be obvious to one skilled in the art, may be made within the spirit of the invention as set forth in the appended claims.

Having thus described my invention, I claim:

1. A process for recovering alcohols present in an oil condensate product obtained from the condensation of the reaction effluent produced in the hydrogenation of oxides of carbon, which comprises: contacting said oil condensate product with carbon disulfide and an alkali to convert alcohols contained therein to their corresponding xanthates; contacting the resulting mixture with an aqueous solution of at least one solvent having a preferential solvent power for said xanthates selected from the group consisting of an alcohol, ketone and a cyclic ether to produce an extract phase and a raffinate phase; separating said phases; contacting said extract phase with a mineral acid to convert said xanthates to their corresponding alcohols and reform carbon disulfide; separating alcohols thus produced from said reformed carbon disulfide; and returning separated reformed carbon disulfide for further contact with more of said oil condensate product.

2. A process for recovering alcohols present in an oil condensate product obtained from the condensation of the reaction effluent produced in the hydrogenation of oxides of carbon, which comprises: contacting said oil condensate product with a solvent for said alcohols to produce an extract phase and a raffinate phase; separating said phases; contacting said extract phase with carbon disulfide and an alkali to convert alcohols contained therein to their corresponding xanthates; contacting the resulting mixture with an aqueous solution of at least one solvent having a preferential solvent power for said xanthates selected from the group consisting of an alcohol, ketone and a cyclic ether to produce an extract phase and a raffinate phase; separating said phases; contacting said last-mentioned extract phase with a mineral acid to convert said xanthates to their corresponding alcohols and reform carbon disulfide; separating alcohols thus produced from said reformed carbon disulfide; and returning separated reformed carbon disulfide for further contact with more of said oil condensate product.

3. A process for recovering alcohols present in an oil condensate product obtained from the condensation of the reaction effluent produced in the hydrogenation of oxides of carbon, which comprises: contacting said oil condensate product with carbon disulfide and an alkali to convert alcohols contained therein to their corresponding xanthates; contacting the resulting mixture with an aqueous solution of at least one solvent having a preferential solvent power for said xanthates selected from the group consisting of an alcohol, ketone and a cyclic ether to produce an extract phase and a raffinate phase; separating said phases; contacting said extract phase with a mineral acid to convert said xanthates to their corresponding alcohols and reform carbon disulfide; and separating alcohols thus produced from said reformed carbon disulfide.

4. The process of claim 3 wherein the solvent for said xanthates is an alcohol.

5. The process of claim 3 wherein the solvent for said xanthates is methanol.

6. The process of claim 3 wherein the solvent for said xanthates is ethanol.

7. The process of claim 3 wherein the solvent for said xanthates is a ketone.

8. The process of claim 3 wherein the solvent for said xanthates is acetone.

9. The process of claim 3 wherein the solvent for said xanthates is methyl ethyl ketone.

10. The process of claim 3 wherein the solvent for said xanthates is a cyclic ether.

11. The process of claim 3 wherein the solvent for said xanthates is a dioxane.

12. A process for recovering alcohols present in an oil condensate product obtained from the condensation of the reaction effluent produced in the hydrogenation of oxides of carbon, which comprises: contacting said oil condensate product with a solvent for said alcohols to produce an extract phase and a raffinate phase; separating said phases; contacting said extract phase with carbon disulfide and an alkali to convert alcohols contained therein to their corresponding xanthates; contacting the resulting mixture with an aqueous solution of at least one solvent having a preferential solvent power for said xanthates selected from the group consisting of an alcohol, ketone and a cyclic ether to produce an extract phase and a raffinate phase; separating said phases; contacting said last-mentioned extract phase with a mineral acid to convert said xanthates to their corresponding alcohols and reform carbon disulfide; and separating alcohols thus produced from said reformed carbon disulfide.

13. The process of claim 12 wherein the solvent for said alcohols is an aqueous solution of a water-soluble alcohol.

14. The process of claim 12 wherein the solvent for said alcohols is an aqueous solution of methanol.

15. The process of claim 12 wherein the solvent for said alcohols is an aqueous solution of ethanol.

16. The process of claim 12 wherein the solvent for said alcohols is an aqueous solution of propanol.

17. The process of claim 12 wherein the mineral acid is hydrochloric acid.

18. The process of claim 12 wherein the mineral acid is sulfuric acid.

19. A process for recovering alcohols present in an oil condensate product obtained from the condensation of the reaction effluent produced in the hydrogenation of oxides of carbon, which comprises: contacting said oil condensate product with an aqueous solution of methanol to produce an extract phase and a raffinate phase; separating said phases; separating methanol from said extract phase; contacting the remaining portion of said extract phase with carbon disulfide and potassium hydroxide to convert alcohols contained therein to their corresponding xanthates; contacting the resulting mixture with an aqueous solution of dioxane to produce an extract phase comprising said xanthates and a raffinate phase comprising the remainder of said oil condensate product, alcohol-free; separating said phases; contacting said last-mentioned extract phase with hydrochloric acid to convert said xanthates to their corresponding alcohols and reform carbon disulfide; separating alcohols thus produced from said reformed carbon disulfide; and returning separated reformed carbon disulfide for further contact with more of said oil condensate product.

20. A process for recovering alcohols present in an oil condensate product obtained from the condensation of the reaction product obtained from the condensation of the reaction effluent produced in the hydrogenation of oxides of carbon, which comprises: contacting said oil condensate product with an aqueous solution of methanol to produce an extract phase and a raffinate phase; separating said phases; contacting said extract phase with carbon disulfide and an alkali to convert alcohols contained therein to their corresponding xanthates; contacting the resulting mixture with an aqueous solution of dioxane to produce an extract phase and a raffinate phase; separating said phases; contacting said last-mentioned extract with hydrochloric acid to convert said xanthates to their corresponding alcohols and reform carbon disulfide; and separating alcohols thus produced from said reformed carbon disulfide.

WILLIAM E. HANFORD.

References Cited in the file of this patent

UNITED STATES PATENTS

| Number | Name | Date |
|---|---|---|
| 1,716,273 | James | June 4, 1929 |
| 1,838,547 | Haslam | Dec. 29, 1931 |
| 1,870,816 | Lewis | Aug. 9, 1932 |
| 2,037,718 | Graves | Apr. 21, 1936 |
| 2,101,649 | Groll | Dec. 7, 1937 |
| 2,107,065 | Van Peski | Feb. 1, 1938 |
| 2,470,782 | McGrath et al. | May 24, 1949 |
| 2,505,752 | Burton | May 2, 1950 |

FOREIGN PATENTS

| Number | Country | Date |
|---|---|---|
| 15,777 | Great Britain | 1912 |

OTHER REFERENCES

U. S. Naval Technical Missions Report, September 2, 1947, page 90.